June 24, 1930.  A. W. BEAMAN  1,767,272
KNIFE GRINDER BEARING
Filed Aug. 25, 1927
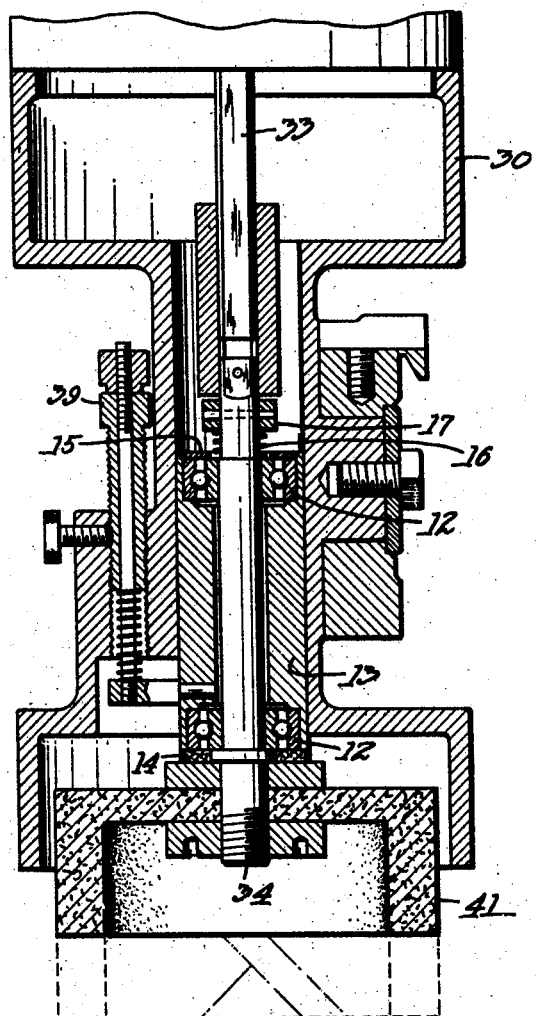
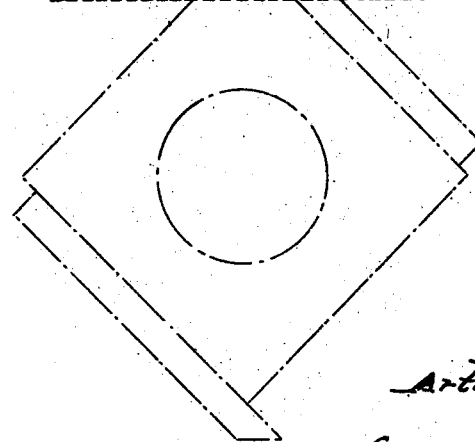

Patented June 24, 1930

1,767,272

UNITED STATES PATENT OFFICE

ARTHUR W. BEAMAN, OF WORCESTER, MASSACHUSETTS

KNIFE-GRINDER BEARING

Application filed August 25, 1927. Serial No. 215,472.

This invention relates to a bearing capable of general use but particularly adapted as an improvement on the bearing of the patent to Allison P. Redden, No. 1,085,876 dated February 3, 1914.

The principal objects of this invention are to provide anti-friction bearings for the grinding wheel spindle to produce a greater durability and smooth running free from vibration, thereby giving a keener edge to the knives ground; to provide a sleeve of increased diameter for receiving the bearings, and to provide means to automatically take up slack between the bearings.

Other objects and advantages of the invention will appear hereinafter.

Reference is to be had to the accompanying drawing which is a diametrical cross sectional view of a grinding wheel and the spindle therefor with the bearing and associated parts constructed in accordance with this invention.

The grinding wheel 41 is shown as in the same form as in the Redden patent above mentioned and it is supported at one end of the spindle 34 which is driven from above by a motor shaft 35 located in the crown 30 of the frame. The way of mounting the bridge 10 and associating it with the carriage 20 are not illustrated herein as these matters can be taken care of in the same manner as shown in the Redden patent.

The spindle 34 is provided with two ball bearings 12, one located near each end, the outer ring of each ball bearing being seated in the cup-shaped end of a sleeve 13 of a diameter considerably larger than that of the corresponding member shown in the above mentioned patent. At the lower end is a compressed felt dust washer 14 surrounding the spindle and receiving the edge of the ball bearing. This washer extends to the circumference of the sleeve 13.

At the top, engaging the other ball bearing in a similar way, is the dust-cap 15 having a snap fit in the end of the sleeve and formed of steel. This dust-cap has an opening therethrough through which passes a spring 16 resting on the inner race of the ball bearing. This spring bears above on a stationary member 17 on the spindle and exerts constant pressure on the inner race of the ball bearing to tend to force that down and the other one up, so as to reduce vibration by this yielding construction. By taking up the slack between the two bearings in this simple manner, an important advantage will be secured as stated.

The bearings and the space between them are packed with light grease. The stone is held on the spindle in the usual way and the adjusting means 39 with associated parts is used as in the Redden patent.

This invention adds to the durability of the machine and the smoothness of its action, thus increasing the value of the machine itself and the quality of the work which it accomplishes. It is easily replaceable in the old machine to take the place of old parts. Furthermore, the invention can be applied to other types of grinding machines, at least in its general principles.

Although I have illustrated and described only one form of the invention, I am aware of the fact that modifications can be made therein by any person skilled in the art without departing from the scope of the invention as expressed in the claims. Therefore, I do not wish to be limited in these respects, but what I do claim is:

1. In a grinding machine, the combination with a hollow support, of a sleeve located therein, ball bearings in the ends of the sleeve, a spindle carried by the inner races of said ball bearings, a grinding wheel on the end of the spindle, a motor shaft at the opposite end of the spindle for driving it, a spring bearing on the inner race of one ball bearing for taking up slack between the two ball bearings and reducing vibration and a dust-excluding compressible washer located between the outer race of the other ball bearing and the grinding wheel.

2. In a grinding machine, the combination with a support having a passage therethrough, of a sleeve located in said passage, the opposite ends of the sleeve being cupped out, ball bearings located in said opposite ends, a spindle passing through the sleeve and supported by said ball bearings, a wheel carried on the end of the spindle, a coil spring surrounding the spindle and engaging the inner race of one ball bearing, and means against which the other end of the spring bears so as to apply pressure to press the two inner races toward each other.

3. In a grinding machine, the combination with a support having a cylindrical passage therethrough, of a sleeve located in said passage, means for preventing the sleeve from turning and for adjusting the sleeve longitudinally in the passage, the opposite ends of the sleeve being cupped out, ball bearings located in said opposite ends, the outer races thereof being supported by the sleeve, a spindle passing through the sleeve longitudinally and supported by the inner races of said ball bearings, an annular wheel carried on the end of the spindle, means to rotate the spindle, a dust-cap fitting in one end of the sleeve over the ball bearing and having a central perforation, a spring on the spindle passing through the opening, and engaging the inner race of the ball bearing, and means fixed to the spindle against which the other end of the spring bears so as to apply pressure constantly while the spindle is rotating to press the two inner races toward each other.

In testimony whereof I have hereunto affixed my signature.

ARTHUR W. BEAMAN.